United States Patent [19]
Kunimine

[11] 3,818,150
[45] June 18, 1974

[54] TELEPHONE SWITCHHOOK WITH BI-DIRECTIONAL OPERATION

[75] Inventor: Isao Kunimine, Kanagawa, Japan

[73] Assignees: Nippon Tsu Shin Kogyo K.K., Kawasaki-shi, Japan; TIE/Communications, Inc., Stamford, Conn. ; part interest to each

[22] Filed: Nov. 2, 1972

[21] Appl. No.: 303,189

[30] Foreign Application Priority Data

Apr. 27, 1972 Japan ................................ 47-49144

[52] U.S. Cl. ............................ 179/164, 179/100 C
[51] Int. Cl. ............................................ H04m 1/08
[58] Field of Search........ 179/100 C, 159, 160, 163, 179/164, 165, 100 R, 100 D, 178

[56] References Cited

UNITED STATES PATENTS

| | | | |
|---|---|---|---|
| 2,640,109 | 5/1953 | O'Neil | 179/100 C |
| 2,848,554 | 8/1958 | Kucharski | 179/100 D |

*Primary Examiner*—Thomas W. Brown
*Assistant Examiner*—Randall P. Myers
*Attorney, Agent, or Firm*—Kenyon & Kenyon

[57] ABSTRACT

Switchhook apparatus for a telephone subset including a receiver cradle fastened to two interconnected members, mounted for rotation on shafts whose axes are mutually perpendicular.

5 Claims, 6 Drawing Figures

TELEPHONE SWITCHHOOK WITH BI-DIRECTIONAL OPERATION

BACKGROUND OF THE INVENTION

The invention relates to telephone subsets. Conventional subsets are designed for use either on substantially horizontal surfaces, or on substantially vertical surfaces. In either case, the subset's switchhook is kept in the unactivated or "on-hook" condition by the weight of the receiver. Lifting the receiver releases the switchhook, placing the subset in the activated or "off-hook" condition.

These subsets are not interchangeable in respect of their mounting position. If a subset intended for vertical mounting is placed on a horizontal surface, or if a subset intended for horizontal mounting is placed on a vertical surface, its switchhook does not operate properly in the "on-hook" condition.

SUMMARY OF THE INVENTION

It is, therefore, an object of the invention to provide a telephone subset which can be installed in either a horizontal or a vertical position.

A further object of the invention is to provide a telephone subset, which incorporates a new switchhook so constructed and arranged, that the subset can be mounted in either a vertical or a horizontal position.

In accordance with the invention, a telephone subset incorporates switchhook apparatus having two degrees of freedom of motion. The apparatus includes switchhook lever means, mounted on first shaft means, for rotation about the axis of the first shaft means. The switchhook apparatus further includes vertical motion conversion means, which is secured to the lever means by a second shaft means, and about the axis of which, the conversion means is free to rotate. The respective axes of the two shaft means are mutually perpendicular, and the combination is so constructed and arranged that the subset in use can be mounted in vertical or horizontal positions.

DESCRIPTION OF THE PREFERRED EMBODIMENTS

Figure 4:
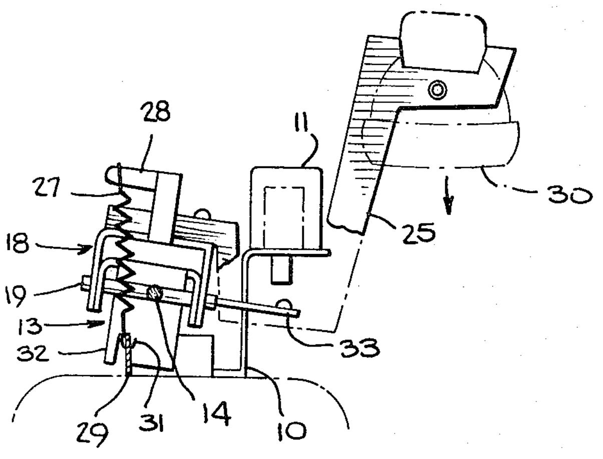
FIG. 4 is a partial side view of a horizontally mounted subset, incorporating the apparatus shown in FIG. 1.

In accordance with the invention, a conventional telephone subset (not illustrated in detail, but partially shown in phantom in FIG. 4) is modified to incorporate switchhook apparatus constructed in accordance with the invention.

Figure 1:
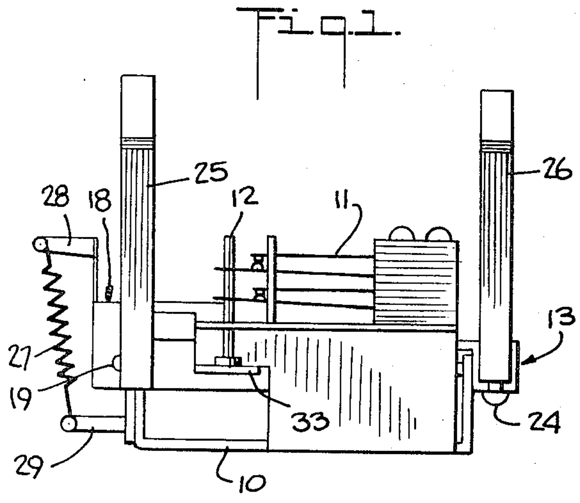
FIG. 1 is a front view of switchhook apparatus constructed in accordance with the invention.
Figure 2:
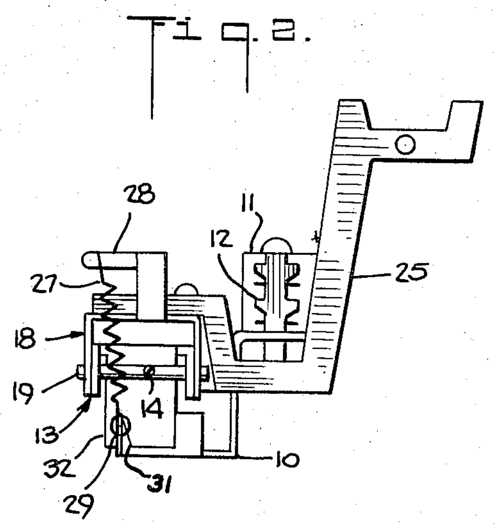
FIG. 2 is a side view of the apparatus shown in FIG. 1.
Figure 3:
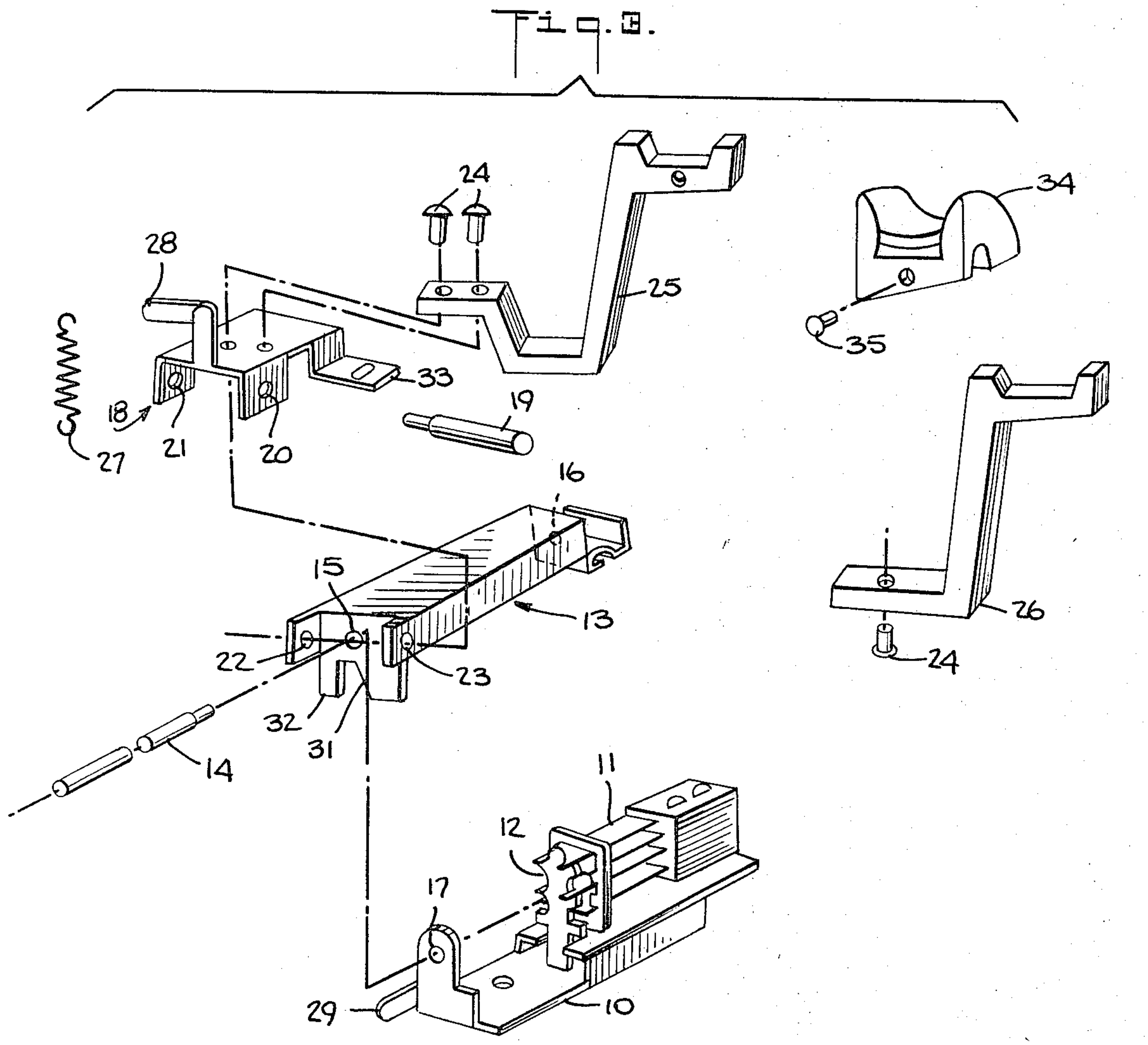
FIG. 3 is an exploded perspective view of the apparatus shown in FIG. 1.

Referring to FIGS. 1–3, the switchhook apparatus includes a switchhook frame 10, on which electrical contact means 11, and a contact activator 12, are mounted. A switchhook lever means 13 is pinned to frame 10 by a first shaft means 14, which extends through holes 15, 16 in the lever means 13, and holes 17 (only one of which is illustrated) in frame 10; lever means 13 is free to rotate about the axis defined by shaft means 14.

A vertical motion conversion means 18 is pinned to lever means 13 by a second shaft means 19, which extends through holes 20, 21 of conversion means 18, and holes 22, 23 of lever means 13; vertical motion conversion means 18 is free to rotate about the axis defined by shaft means 19. In accordance with the invention, the axis of rotation of first shaft means 14 is at right angles to the axis of rotation of second shaft means 19.

Fasteners, for example screws 24, are used to secure a first hanger means 25 to conversion means 18, and a second hanger means 26 to lever means 13. Restoring force means, e.g., spring means 27 is mounted between the motion conversion means 18 and the frame 10, by securing the ends thereof to the projecting hooks 28, 29.

FIG. 4 illustrates the "on-hook" condition of the switchhook apparatus incorporated in a subset used in a horizontal mounting position. A receiver 30 is placed on hanger means 25, 26; the downwardly directed weight of the receiver 30 causes the lever means 13 to rotate (in a clockwise direction as viewed in FIG. 4) on shaft means 14, until a projecting leg 31 on the lever means 13 abuts hook 29. In this position, spring means 27 is in tension to provide energy for a restoring force, which is applied through conversion means 18 to the lever means 13, when the receiver 30 is removed from the hanger means 25, 26 ("off-hook" condition).

When the receiver 30 is removed, the lever means 13 rotates, (in a counterclockwise direction as viewed in FIG. 4) in response to the restoring force imparted thereto by spring means 27, until projecting leg 32, on the lever means 13, abuts hook 29. In this position, projecting leg 33 on motion conversion means 18 abuts contact activator 12, moving it thereby to engage the contacts of electrical contact means 11 (as shown in FIG. 1), so that telephone communications can be initiated or received by the subset.

Figure 5:
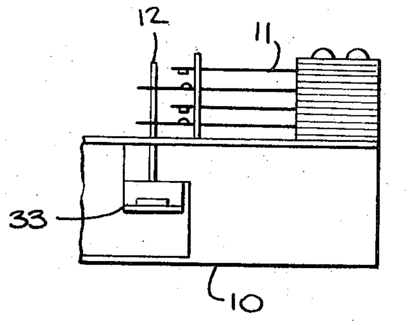
FIG. 5 is a front view of a portion of the apparatus shown in FIG. 1, illustrating the position taken by electrical contacts in the "on-hook" condition.

When receiver 30 is replaced on the hanger means 25, 26, rotation of lever means 13 (clockwise as viewed in FIG. 4) disengages projecting leg 33 from contact activator 12, thereby restoring the contacts of electrical contact means 11 to the "on-hook" position (as shown in FIG. 5).

Figure 6:
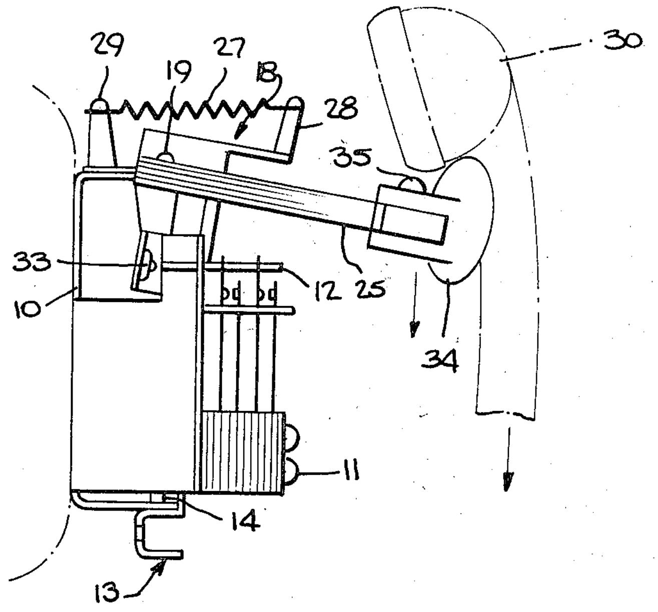
FIG. 6 is a partial front view of a vertically mounted subset, incorporating the apparatus shown in FIG. 1.

FIG. 6 illustrates the same switchhook apparatus incorporated in a subset used in a vertical mounting position. In this case, a receiver cradle 34 may be fastened to hanger means 25, e.g., by screw 35, and hanger means 26 removed. In the "on-hook" condition, shown in FIG. 6, motion conversion means 18 rotates (clockwise as viewed in FIG. 6) about the shaft means 19 until it abuts lever means 13, disengaging projecting leg 33 from contact activator 12. This rotation also places spring means 27 under tension to provide a restoring force to rotate (in a counterclockwise direction as viewed in FIG. 6) conversion means 18, when receiver 30 is removed from cradle 34, so that projecting leg 33 engages activator 12 to establish the "on-hook" position of the contacts in electrical contact means 11. (FIG. 5)

It is to be appreciated by those skilled in the art that contact means 11 can be replaced by any other conventional switching apparatus, for example, a microswitch, and that other desired modifications may be made to the apparatus disclosed, without departing from the spirit and scope of the invention.

What is claimed is:

1. Telephone switchhook apparatus capable of movement in two directions for installation in a desk and wall mounted subset, said apparatus comprising:

a switchhook frame;

an electrical contact means mounted to said switchhook frame;

a switchhook lever means;

a first shaft means for mounting said switchhook lever means within said switchhook frame permitting the rotation of said lever means in said first direction about the axis of said shaft means;

a motion conversion means;

a second shaft means for securing said conversion means to said lever means for permitting the rotation of said conversion means in said second direction about an axis at right angles to the axis of said first shaft means; and means connected to said switchhook frame for activating said contact means upon the movement of said switchhook lever means in said one direction when the switchhook apparatus is installed in a desk subset and for activating said contact means upon the movement of said motion conversion means in said second direction when said switchhook apparatus is installed in a wall mounted subset.

2. Switchhook apparatus according to claim 1 which further comprises receiver hanger means fastened to said switchhook lever means and said conversion means for rotating said lever means in said first direction when the switchhook apparatus is installed in a desk set and for rotating said conversion means in said second direction when the switchhook apparatus is installed in a wall mounted set; and mechanical energy storage means, coupled between said conversion means and said frame means, for rotating said conversion means about the axis of said second shaft means, and for rotating said lever means about the axis of said first shaft means.

3. In a telephone subset, switchhook apparatus capable of movement in two directions, said apparatus comprising:

a switchhook frame;

a switchhook lever means;

a first shaft means for mounting said switchhook lever means within said switchhook frame permitting the rotation of said lever means in said first direction about the axis of said shaft means;

a motion conversion means;

a second shaft means for securing said conversion means to said lever means for permitting the rotation of said conversion means in said second direction about an axis at right angles to the axis of said first shaft means; the combination being so constructed and arranged that said switchhook apparatus can be used in a subset mounted in vertical and horizontal positions.

4. In a telephone subset according to claim 3 having a receiver connected to said subset and wherein said telephone subset switchhook apparatus further comprises a receiver hanger means fastened to said conversion means; and mechanical energy storage means, coupled between said conversion means and said frame means for rotating said conversion means about the axis of said second shaft means, when said subset is mounted in the vertical position and said receiver is removed from said receiver hanger means, and for rotating said lever means about the axis of said first shaft means, when said subset is mounted in a horizontal position and said receiver is removed from said receiver hanger means.

5. In a telephone subset according to claim 4 wherein said conversion means further includes means for establishing the subset's electrical connections representative of the "off-hook" and "on-hook" conditions thereof when said receiver is removed from and replaced on said receiver hanger means.

* * * * *